United States Patent
Shen

(10) Patent No.: US 7,343,454 B2
(45) Date of Patent: Mar. 11, 2008

(54) METHODS TO MAINTAIN TRIANGLE ORDERING OF COHERENCE MESSAGES

(75) Inventor: Xiaowei Shen, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 10/989,755

(22) Filed: Nov. 16, 2004

(65) Prior Publication Data

US 2006/0106995 A1 May 18, 2006

(51) Int. Cl.
*G06F 12/00* (2006.01)
(52) U.S. Cl. ......................... 711/119; 711/141
(58) Field of Classification Search ................ 711/119, 711/141
See application file for complete search history.

(56) References Cited

U.S. PATENT DOCUMENTS

| 6,209,064 | B1 * | 3/2001 | Weber ................... 711/141 |
| 6,247,141 | B1 * | 6/2001 | Holmberg ................ 714/2 |
| 6,253,291 | B1 * | 6/2001 | Pong et al. ............. 711/146 |
| 6,389,513 | B1 * | 5/2002 | Closson ................. 711/129 |
| 2003/0061395 | A1 * | 3/2003 | Kingsbury et al. ......... 709/312 |
| 2005/0140735 | A1 * | 6/2005 | Suzuki .................... 347/56 |
| 2006/0095535 | A1 * | 5/2006 | Govindaraju et al. ...... 709/217 |

OTHER PUBLICATIONS

Adelstein et al., Real-Time Casual Message Ordering in Multimedia Systems, 1995, pp. 36-43.*
Milo M. K. Martin, et al., Token Coherence: Decoupling Performance and Correctness, Processin International Symposium on Computer Architecture, Jun. 9-11, 2003, pp. 12.

* cited by examiner

*Primary Examiner*—Donald A Sparks
*Assistant Examiner*—Aracelis Ruiz
(74) *Attorney, Agent, or Firm*—F. Chau & Associates, LLC

(57) ABSTRACT

We present a triangle ordering mechanism that maintains triangle ordering of coherence messages in SMP systems. If cache A sends a multicast message to caches B and C, and if cache B sends a message to cache C after receiving and processing the multicast message from cache A, the triangle ordering mechanism ensures that cache C processes the multicast message from cache A before processing the message from cache B. The triangle ordering mechanism enables efficient snoopy cache coherence in SMP systems in which caches communicate with each other via message-passing networks. A modified version of the triangle ordering mechanism categorizes coherence messages into non-overlapping sequencing classes, and ensures triangle ordering for coherence messages in the same sequencing class. The modified triangle ordering mechanism can significantly reduce potential performance degradation due to false waiting.

27 Claims, 7 Drawing Sheets

Assume
(1) Cache A multicasts a (causing) message to caches B and C;
(2) Cache B receives the (causing) message from cache A;
(3) Cache B sends a (resulting) message to cache C after receiving and processing the (causing) message from cache A.

Triangle ordering ensures that cache C processes the (causing) message from cache A before processing the (resulting) message from cache B.

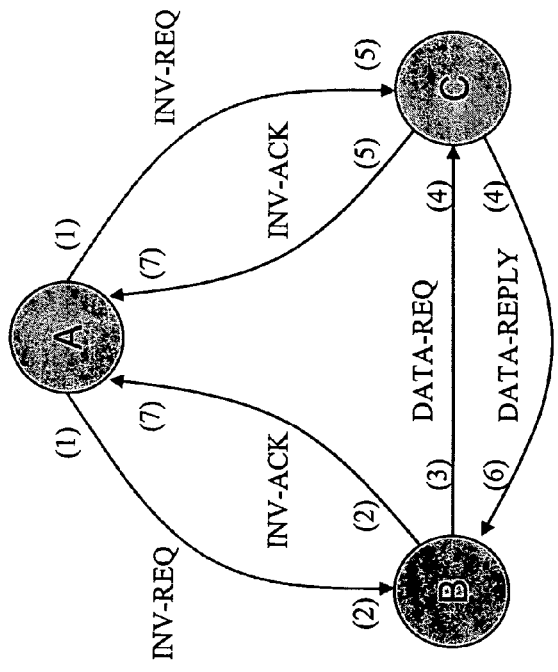

Initially caches A and C include the shared data. Assume cache C can source data to another cache.
(1) Cache A broadcasts an invalidate request to caches B and C;
(2) Cache B receives the invalidate request, and sends an acknowledgment to cache A;
(3) Cache B broadcast a data request to cache A (not shown) and cache C;
(4) Cache C receives the data request, and sends a data reply to cache B;
(5) Cache C receives the invalidate request, and sends an acknowledgment to cache A;
(6) Cache B receives the data reply from cache C;
(7) Cache A receives the invalidate acknowledgments from caches B and C.

**Figure 3
(Prior Art)**

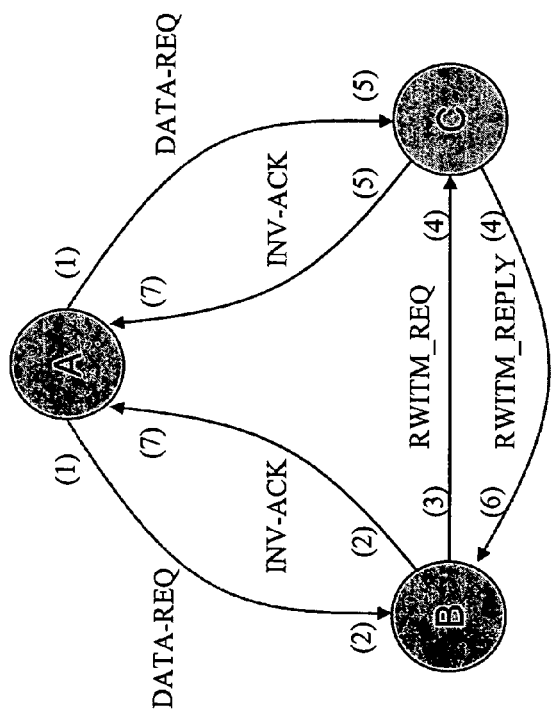

Initially cache C includes an exclusive copy of the data.
(1) Cache A broadcasts a data request to caches B and C;
(2) Cache B receives the data request, and sends an invalid acknowledgment to cache A;
(3) Cache B broadcast a RWITM request to cache A (not shown) and cache C;
(4) Cache C receives the RWITM request, and sends the data with exclusive ownership to cache B;
(5) Cache C receives the data request, and sends an invalid acknowledgment to cache A;
(6) Cache B receives the data with exclusive ownership from cache C;
(7) Cache A receives the invalid acknowledgments from caches B and C.

**Figure 4
(Prior Art)**

Assume
(1) Cache A multicasts a (causing) message to caches B and C;
(2) Cache B receives the (causing) message from cache A;
(3) Cache B sends a (resulting) message to cache C after receiving and processing the (causing) message from cache A.

Triangle ordering ensures that cache C processes the (causing) message from cache A before processing the (resulting) message from cache B.

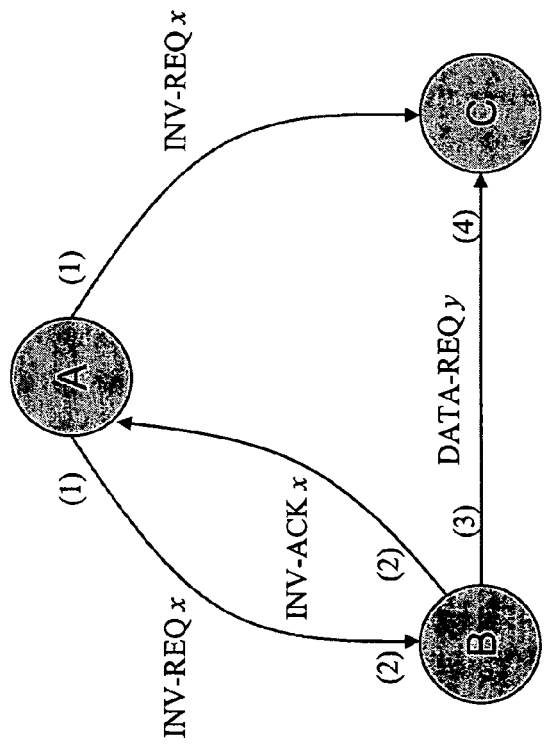

Initially caches A includes a shared copy of address x, and cache C includes a shared copy of address y that can be sourced to another cache.
(1) Cache A broadcasts an invalidate request on address x to caches B and C;
(2) Cache B receives the invalidate request, and sends an acknowledgment to cache A;
(3) Cache B sends a data request on address y to cache C;
(4) Cache C receives the data request on y before the invalidate request on x.

Figure 7

METHODS TO MAINTAIN TRIANGLE ORDERING OF COHERENCE MESSAGES

GOVERNMENT RIGHTS STATEMENT

This invention was made under Government support under Contract No.: NBCHC020056 awarded by DARPA. The Government has certain rights in this invention.

BACKGROUND OF THE INVENTION

1. Field of the Invention

The present invention relates to a computer-based memory system, and, more particularly, to methods to maintain triangle ordering of coherence message in multi-processor systems.

2. Description of the Related Art

A symmetric multiprocessor ("SMP") system generally employs a snoopy mechanism to ensure cache coherence among multiple caches. When a cache miss occurs in a requesting cache, the requesting cache broadcasts a cache request to other caches and the memory in the SMP system. When a supplying cache receives the cache request, the supplying cache performs a cache snoop operation and produces a snoop response indicating whether the requested data is found in the cache, and the state of the corresponding cache line if the requested data is found. If the requested data is found in an appropriate cache state, the supplying cache can supply the data to the requesting cache via a cache intervention. The memory is responsible for supplying the requested data to the requesting cache if the snoop responses show that the requested data cannot be supplied from any of the other caches.

Many snoopy cache coherence protocols have been proposed. The MESI protocol and its variations are widely used in SMP systems. The MESI protocol has four cache states, namely modified (M), exclusive (E), shared (S) and invalid (I). At any time, a cache line in a cache can be in one of the four cache states (or possibly some transient state). If a cache line is in the invalid state, the data is not valid in the cache. If a cache line is in the shared state, the data is valid in the cache and can also be valid in other caches. The shared state is entered when the data is retrieved from the memory or another cache, and the corresponding snoop responses indicate that the data is valid in at least one of the other caches. If a cache line is in the exclusive state, the data is valid in the cache, and cannot be valid in another cache. Furthermore, the data has not been modified with respect to the data maintained at the memory. The exclusive state is entered when the data is retrieved from the memory or another cache, and the corresponding snoop responses indicate that the data is not valid in another cache. If a cache line is in the modified state, the data is valid in the cache and cannot be valid in another cache. Furthermore, the data has been modified as a result of a store operation.

When a cache miss occurs, if the requested data is found in both the memory and another cache, supplying the data to the requesting cache via a cache intervention is often preferred because cache-to-cache transfer latency is usually smaller than memory access latency. The IBM® Power 4 system, for example, enhances the MESI protocol to allow more cache interventions. An enhanced coherence protocol allows data of a shared cache line to be supplied to another cache via a cache intervention. In addition, if data of a modified cache line is supplied to another cache, the modified data is not necessarily written back to the memory immediately. A cache with the most up-to-date data can be held responsible for memory update when the data is eventually replaced.

Referring now to FIG. 1, in a modern SMP system, caches can be connected with each other via a message-passing interconnect instead of a shared bus to improve system scalability and performance. In a bus-based SMP system, the bus behaves as a central arbitrator that serializes all bus transactions to ensure a total order of bus transactions. In a network-based SMP system, in contrast, when a requesting cache broadcasts a message, the message is not necessarily received at the same time by the caches that receive the message. As a result, different messages can potentially be received in different orders at different receiving caches.

Therefore, the following set of chronological events is possible: (1) Cache A broadcasts a first message to caches B and C; (2) cache B receives the first message from cache A and then sends a second message to cache C; and (3) cache C receives the second message from cache B before receiving the first message from cache. As apparent to those skilled in the art, a problem affecting the correctness of cache coherence may arise if the first message from cache A affects the second message generated at cache B, and the order in which the messages are received at cache C affects the coherence action taken at cache C. We refer to this scenario as a "violation of triangle ordering" because the messages involved logically form a triangle.

Referring now to FIG. 2, an exemplary diagram of a simple triangle ordering violation is shown. Chronological events are labeled using event numbers in parentheses, such that a lower numbered event occurs before a higher numbered event, unless otherwise noted. Thus, event (1) occurs before event (2), which occurs before event (3), etc. FIG. 2 illustrates the occurrence of a chronological set of events (1) through (5). The simple triangle ordering violation involves three caches and two broadcast messages. The caches are represented using circles A, B and C, respectively. The messages are represented by directional lines between caches. Although FIG. 2 involves only three caches and two messages, it should be appreciated that a triangle ordering violation may involve more than three caches and more than two messages, as contemplated by those skilled in the art. FIG. 2 illustrates the following sequence of chronological events.

(1) Cache A broadcasts a first message to caches B and C.
(2) Cache B receives the first message from cache A.
(3) Cache B sends a second message to cache C.
(4) Cache C receives the second message from cache B.
(5) Cache C receives the first message from cache B.

FIGS. 3 and 4 illustrate two examples demonstrating that correctness of cache coherence can be compromised when a broadcast or multicast message can be received at different times at different caches. It should be appreciated, however, that one skilled in the art would contemplate other scenarios that would cause a triangle ordering violation.

Referring now to FIG. 3, an exemplary diagram is shown in which cache coherence can be violated when an invalidate request is not observed atomically. Assume, that data of an address is initially shared in caches A and C. Further assume that cache C can source the shared data to another cache via a cache intervention. FIG. 3 illustrates the following sequence of chronological events.

(1) Cache A broadcasts an invalidate request to caches B and C to claim the exclusive ownership of the cache line. This may happen, for example, when a processor associated with cache A performs a store operation to the address.

(2) Cache B receives the invalidate request from cache A, and sends an invalidate acknowledgment to cache A. The invalidate acknowledgment indicates that the data is not found in cache B.

(3) Cache B broadcasts a data request to cache A and cache C (the data request to cache A is not shown). This may happen, for example, when a processor associated with cache B performs a load operation to the address.

(4) Cache C receives the data request from cache B, and sends a data reply to cache B to supply a shared copy of the data. Note that cache C receives the data request from cache B before receiving the invalidate request from cache A.

(5) Cache C receives the invalidate request from cache A, invalidates the shared copy from cache C, and sends an invalidate acknowledgment to cache A.

(6) Cache B receives the data reply from cache C, and caches the data in a shared state.

(7) Cache A receives the invalidate acknowledgments from caches B and C; and claims the exclusive ownership of the cache line. As a result, data of the cache line can be modified in cache A, leaving a stale copy in cache B. This clearly violates cache coherence of the system.

Referring now to FIG. 4, an exemplary diagram is shown in which cache coherence can be violated when a data request is not observed atomically. It is assumed that cache C initially includes data of an address in an exclusive state. FIG. 4 illustrates the following sequence of chronological events.

(1) Cache A broadcasts a data request to caches B and C. This may occur, for example, when a processor associated with cache A performs a load operation.

(2) Cache B receives the data request from cache A, and sends an invalid acknowledgment to cache A. The invalid acknowledgment indicates that the requested data is not found in cache B.

(3) Cache B broadcasts a read-with-intent-to-modify (hereinafter "RWITM") request to caches A and C. This may occur, for example, when a processor associated with cache B performs a store operation. The intent of the RWITM request is to obtain data of the address while claiming the exclusive ownership of the corresponding cache line.

(4) Cache C receives the RWITM request before receiving the data request from cache A, and sends a RWITM reply to cache B to supply the data and the exclusive ownership. The cache line is invalidated from cache C.

(5) Cache C receives the data request from cache A, and sends an invalid acknowledgment to cache A. The invalid acknowledgment indicates that the requested data is not found in cache C.

(6) Cache B receives the RWITM reply from cache C, and caches the data in an exclusive state.

(7) Cache A receives the invalid acknowledgments from caches B and C, and retrieves the requested data from the memory because the invalid acknowledgments falsely indicate that the requested data is not cached in caches B and C. As a result, cache A may obtain a stale copy from the memory, because cache B, with the exclusive ownership of the cache line, may have modified the data without updating the memory.

Several methods have been proposed to guarantee correctness of cache coherence in SMP systems in which caches are interconnected via a message-passing network. One method is to retry certain coherence operations when potential races conditions are detected, which can often result in serious performance penalty and intractable protocol complexity. Another method is to rely on certain ordering guarantees provided by an underlying network or network topology. For example, consider an SMP system in which caches communicate with each other via a unidirectional ring. When a cache intends to broadcast a message, it sends the message to its next cache, which receives the message while forwarding it to its next cache, and so on. It becomes apparent that this message passing mechanism can eliminate violation of triangle ordering, assuming first-in-first-out ("FIFO") message passing between neighboring caches.

Another method is token coherence, which has been proposed to support cache coherence on networks without any message ordering guarantee. It associates a fixed number of tokens with each memory line at the cache line granularity. Tokens are held with caches and memory, and can be transferred using coherence messages. A processor can read a cache line only if the cache line holds at least one token. A processor can write a cache line only when the cache line holds all the tokens. A major drawback of token coherence is the extra cost of maintaining tokens, including storage at both cache and memory sides and coherence actions for token transfers.

SUMMARY OF THE INVENTION

In one aspect of the present invention, a system for ensuring triangle ordering of messages in a computer system is provided. The system includes a plurality of caches comprising a first cache, a second cache and a third cache; a message-passing interconnect connecting the plurality of caches; a triangle ordering mechanism maintained for the first cache, the second cache and the third cache; wherein the first cache sends a first message to the second cache and the third cache, and the second cache sends a second message to the third cache; and wherein the triangle ordering mechanism ensures that the third cache receives and processes the first message before receiving and processing the second message, if the second cache receives and processes the first message before sending the second message.

In another aspect of the present invention, a system for ensuring triangle ordering of messages in a computer system is provided. The system includes a plurality of nodes comprising a first node, a second node and a third node; a message-passing interconnect connecting the plurality of nodes; a triangle ordering mechanism maintained for the first node, the second node and the third node; wherein the first node sends a first message to the second node and the third node, and the second node sends a second message to the third node; and wherein the triangle ordering mechanism ensures that the third node receives and processes the first message before receiving and processing the second message, if the second node receives and processes the first message before sending the second message.

BRIEF DESCRIPTION OF THE DRAWINGS

The invention may be understood by reference to the following description taken in conjunction with the accompanying drawings, in which like reference numerals identify like elements, and in which:

FIG. 3 depicts an exemplary triangle ordering violation scenario in which an invalidate request is not observed atomically in different receiving caches;

FIG. 4 depicts another exemplary triangle ordering violation scenario in which a read request is not observed atomically in different receiving caches;

FIG. 7 depicts an exemplary false waiting scenario in which a message is prevented from being processed due to unnecessary triangle ordering.

DETAILED DESCRIPTION OF PREFERRED EMBODIMENTS

Figure 1:
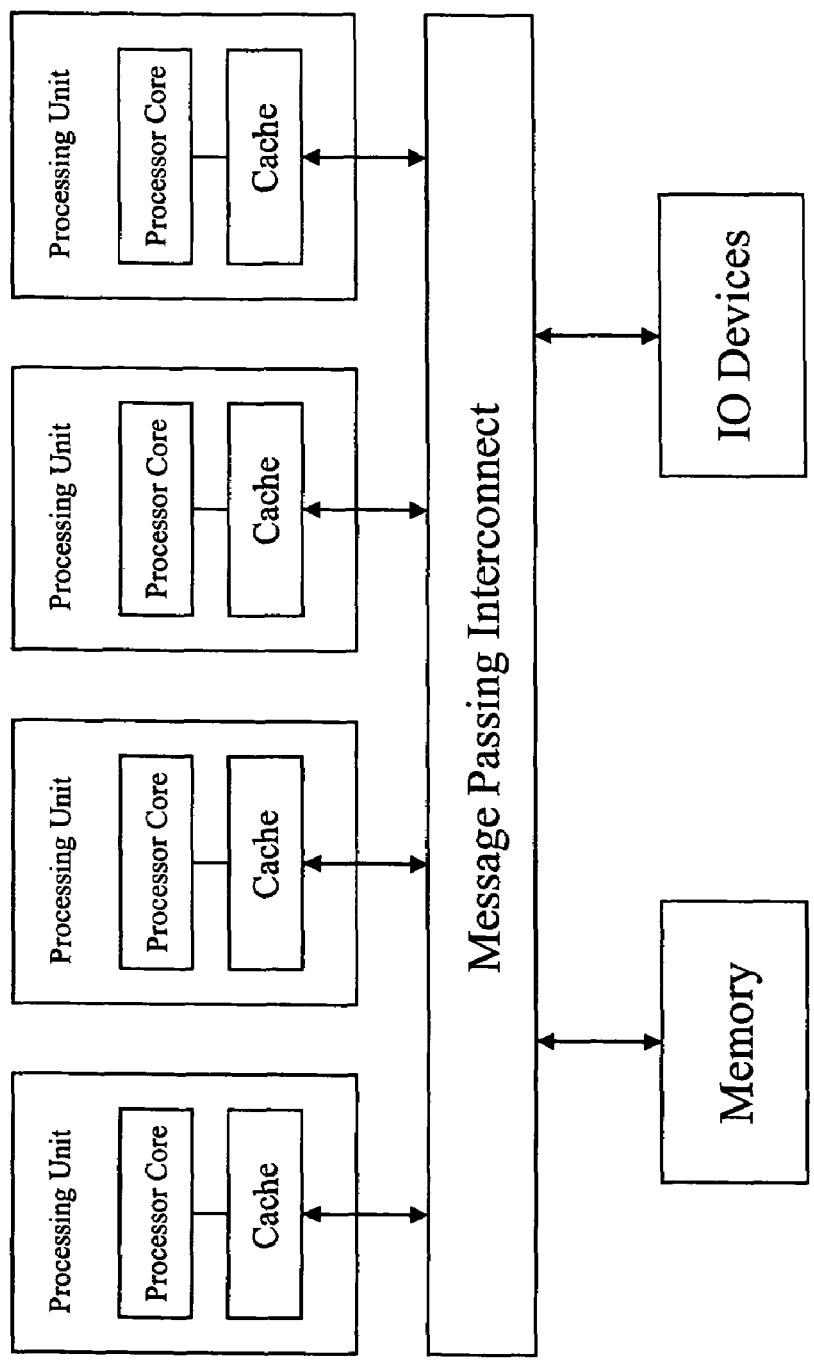
FIG. 1 depicts an exemplary SMP system includes a number of processing units connected via a message-passing interconnect, wherein each processing unit includes a processor core and a cache.
Figure 2:
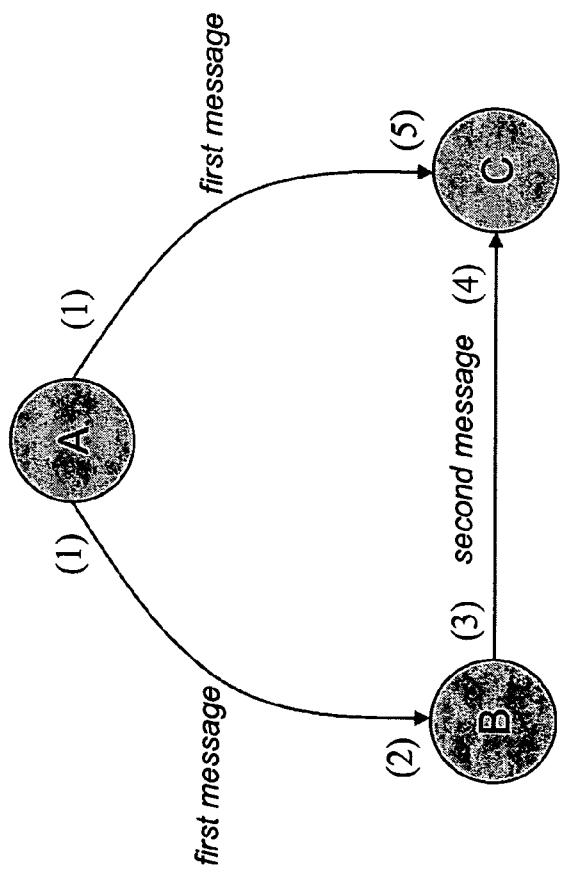
FIG. 2 depicts a sequence of chronological events of a triangle ordering violation involving three caches and two messages.

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof.

The present invention introduces a novel mechanism that guarantees triangle ordering of message processing in SMP systems. Triangle ordering of point-to-point messages can be defined as follows. Suppose: (1) Node A sends a message to node C, then sends a message to node B; and (2) Node B receives and processes the message from node A, and then sends a message to node C. Triangle ordering guarantees that node C processes the message from node A before the message from node B.

Triangle ordering of multicast (including broadcast) messages can be defined as follows. Suppose: (1) Node A sends a multicast message to nodes B and C; (2) Node B receives and processes the multicast message from node A; and then sends a message to node C (this message can be a point-to-point message or a multicast message). Triangle ordering guarantees that node C processes the multicast message from node A before the message from node B.

Figure 5:
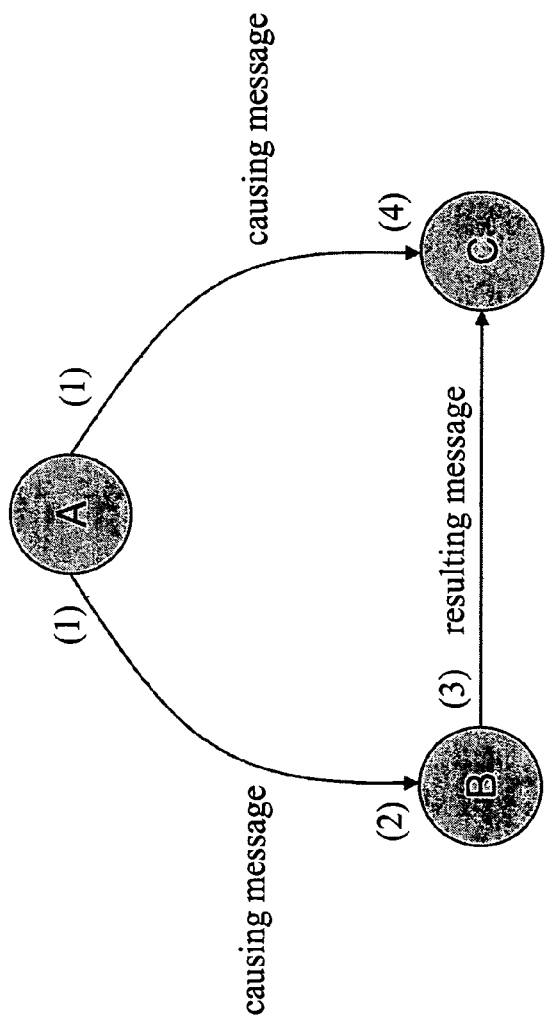
FIG. 5 depicts the triangle ordering definition using a causing message and a resulting message, in accordance with one illustrative embodiment of the present invention.

As shown in the triangle scenario of FIG. 5, the message from node A to node B is referred herein as the "causing" message, and the message from node B to node C is referred herein as the "resulting" message. As used herein, a "multicast message" is a message sent to multiple destinations. It can be one message passed through a multicast tree, or a number of point-to-point messages that are sent to more than one destination independently. Also as used herein, a "broadcast message" is a multicast message sent to all nodes in the system.

We will first present a message sequencing mechanism that guarantees triangle ordering for broadcast messages. The sequencing mechanism may be enhanced to allow point-to-point and multicast messages to be employed as non-causing messages. The enhanced mechanism enables efficient snoopy cache coherence in SMP systems in which caches communicate with each other via message-passing networks.

We will then present a modified version of the message sequencing mechanism that enforces triangle ordering only for coherence messages in the same sequencing group according to some predefined hash function. This can significantly reduce potential performance degradation due to false waiting. Some optimizations and implementation issues will also be discussed.

It should be appreciated that triangle ordering does not necessarily imply a total order of broadcast messages. In other words, broadcast messages issued from different nodes can be received and processed in different orders at different nodes. For SMP systems without a bus, a sequencing mechanism to enforce triangle ordering generally provides sufficient support to enable efficient cache coherence implementations.

Triangle Ordering Mechanism

We now present a sequencing mechanism that can be employed to maintain triangle ordering of broadcast messages. Each broadcast message is labeled with a sequence number. Each node maintains the sequence number of the last received and processed message from each of the other nodes. This sequencing information (i.e., the information contained in the sequence numbers) is associated to each broadcast message issued from the node. When a node receives a broadcast message, it can detect a potential triangle ordering violation by comparing its own sequencing information and the sequencing information associated with the broadcast message.

In an illustrative embodiment of the present invention, we assume FIFO message passing that ensures messages between same source and destination nodes are always received in the order they are issued. It should be understood to those skilled in the art that the methods described herein can be properly modified to be implemented in systems without FIFO message passing support. The sequencing mechanism is described as follows.

Each node maintains a Current Timestamp (hereinafter "CT") that defines the sequence number of the next broadcast message from the node. Initially the CT is set to 1.

Each node maintains a Last Received Timestamp Record (hereinafter "LRTR") which includes a Last Received Timestamp (hereinafter "LRT") entry for each peer node. The LRT records the sequence number of the last received and processed message from the peer node. Initially the LRT is set to 0 for each peer node.

When a node sends a broadcast message, the node uses its CT as the sequence number of the broadcast message. The LRTR maintained in the node is also included in the broadcast message. The CT is incremented by 1 each time a broadcast message is issued.

When a node A receives a broadcast message from a node B, node A compares the LRTR maintained at node A with the LRTR included in the received message (i.e., the LRTR of node B) to determine whether the message can be processed at node A at the time.

If there exists a third node C such that the LRTR included in the received message indicates that a broadcast message issued from node C has been received and processed at node B, while the LRTR maintained at node A indicates that the same broadcast message has not been processed at node A, then the received message cannot be processed at node A. In this case, the received message can be buffered for later processing.

Otherwise the received broadcast message is processed. As a result, in the LRTR maintained at node A, the LRT entry corresponding to node B is updated with the sequence number of the processed message.

In an alternate embodiment, when a received message cannot be processed due to a potential triangle ordering violation, instead of buffering the message as described above, it can be retried by issuing a negative acknowledgment or retry notice to the sending node. When a message is retried, subsequent messages from the same sending node need to be retried until the first retried message, or a message with the same sequence number, is received.

Management of Sequence Numbers

An important implementation issue of the above sequencing mechanism is management of sequence numbers. Starting from sequence number 0, a k-bit sequence number reaches its maximum at sequence number $2^k-1$. A node can reuse a sequence number if the message with that sequence number and all previous messages issued from the same node have been processed in every peer node. This generally requires proper information exchange among sending and receiving nodes to retire sequence numbers properly.

A simple exemplary approach for sequence number management is as follows. When a node issues a message using the maximum sequence number, the node would be prevented from issuing another message until it is informed that the message with the maximum sequence number has been received and processed at each peer node. On the other hand, when a node processes a message using the maximum sequence number, the node issues an acknowledgment to inform the sending node that the message has been received and processed. A drawback of this approach is that a node cannot issue a message throughout the blackout period, from the time the maximum sequence number is used for a message to the time an acknowledgment is received from each peer cache indicating that the message has been processed.

In an alternate embodiment, better management of sequence numbers can be obtained by partitioning the window of sequence numbers into more than one sub-window of sequence numbers. For example, a window of $2^k$ k-bit sequence numbers can be partitioned into $2^j$ (j<k) sub-windows, wherein each sub-window comprises $2^{k-j}$ k-bit sequence numbers. Each node can maintain a j-bit window management flag, indicating the current boundary between sub-windows containing sequence numbers that can be used, and sub-windows containing sequence numbers that cannot be used. When a node processes a message with the maximum sequence number of a sub-window, the node sends a window management acknowledgment to the sending node. When a node receives a window management acknowledgment from each peer node indicating the message with the maximum sequence number of a particular sub-window has been processed, the window management flag of the node is updated accordingly so that sequence numbers contained in the sub-window can be reused.

Partitioning sequence numbers into sub-windows appropriately is important to overall system performance. As the number of sub-windows increases, the average number of sequence numbers in each sub-window decreases. As a result, the overhead of sequence number management increases because more window management messages need to be used. On the other hand, it is less likely that a node cannot issue a broadcast message due to the lack of available sequence numbers.

Consider a window of k-bit sequence numbers that is partitioned into two sub-windows: one from sequence number 0 to sequence number $2^{k-1}-1$, and the other from sequence number $2^{k-1}$ to sequence number $2^k-1$. Each node maintains a 1-bit window management flag that indicates whether a broadcast message can be issued if the sequence number to be used is the first sequence number in one of two sub-windows.

Each node maintains a 1-bit window management flag, which is set to 0 initially. A node cannot issue a broadcast message in either of following two situations.
(1) The window management flag is 0, and CT contains sequence number 0.
(2) The window management flag is 1, and CT contains sequence number $2^{k-1}$.

When a node processes a broadcast message with sequence number $2^{k-1}-1$ or $2^k-1$, the node issues a window management acknowledgment informing the sending node that a message with the sequence number has been processed.

When a node receives a window management acknowledgment from each peer node, the window management flag is toggled to allow sequence numbers in the corresponding sub-window to be reused.

It should be appreciated that window management acknowledgments can be sent as individual messages, or piggybacked to appropriate coherence messages. For example, when a node receives an invalidate request with a sequence number that represents a boundary between two adjacent sub-windows of sequence numbers, the node can combine the invalidate acknowledgment and the window management acknowledgment into one message. This can virtually reduce window management overhead to negligible level.

Figure 6:
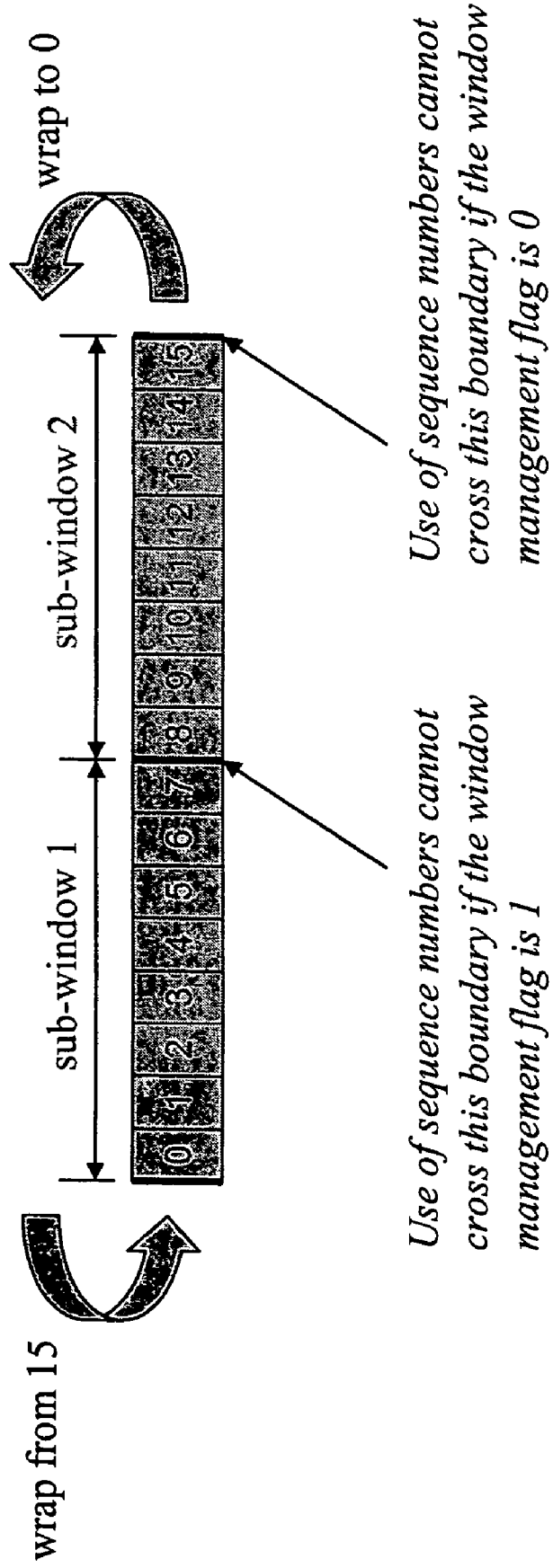
FIG. 6 depicts a 4-bit sequence number management that partitions the window of sequence numbers into multiple sub-windows, in accordance with one illustrative embodiment of the present invention.

FIG. 6 shows an exemplary window management of 4-bit sequence numbers. The window of sequence numbers includes two sub-windows: the first sub-window comprising sequence numbers from 0 to 7, and the second sub-window comprising sequence numbers from 8 to 15. With the window management described above, assignment of sequence numbers cannot cross the boundary from the first sub-window to the second sub-window if the window management flag is 1, and assignment of sequence numbers cannot cross the boundary from the second sub-window to the first sub-window if the window management flag is 0. In other words, when sequence numbers in the first sub-window are being assigned to messages, sequence numbers in the second sub-window cannot be used if the window management flag is 1. Similarly, when sequence numbers in the second sub-window are being assigned to messages, sequence numbers in the first sub-window cannot be used if the window management flag is 0.

With window-based sequence number management, it is possible that a message with a smaller sequence number in a sub-window is issued after a message with a greater sequence number in another sub-window. Suppose a receiving node has processed a message with a sequence number $n_1$ from a sending node (indicated by the LRTR maintained at the receiving node). It can be determined that another message with a sequence number $n_2$ from the same sending node has been processed if one of the following conditions is satisfied.

(1). The window management flag is 0, the most significant bit (hereinafter "MSB") of $n_1$ is 1, and the MSB of $n_2$ is 0.

(2) The window management flag is 0, the MSB of $n_1$ is equal to the MSB of $n_2$, and the least significant bits (hereinafter "LSB"), including all bits except MSB, of $n_1$ is greater than the LSB of $n_2$.

(3) If the window management flag is 1, the MSB of $n_1$ is 0, and the MSB of $n_2$ is 1.

(4) If the window management flag is 1, the MSB of $n_1$ is equal to the MSB of $n_2$, and the LSB of $n_1$ is greater than the LSB of $n_2$.

With the triangle ordering mechanism, we now revisit the example illustrated in FIG. 3. We assume for illustrative purposes that each cache maintains a CT and LRTR. At each cache, the CT is initialized to 1 as the next sequence number to be used, and every LRT entry is initialized to 0 as the sequence number of the last processed message.

(1) Cache A broadcasts an invalidate request with sequence number 1 to caches B and C.

(2) Cache B receives the invalidate request, and sends an invalidate acknowledgment to cache A. In response to the invalidate request, the LRTR at cache B is updated to indicate a message with sequence number 1 from cache A has been processed.

(3) Cache B broadcasts a data request with sequence number 1 to caches A and C. The LRTR maintained at cache B is included in the broadcast message.

(4) Cache C receive the data request before the invalidate request from cache A arrives. By comparing its own LRTR with the LRTR included in the received data request, cache C can detect that a broadcast message with sequence number 1 has been processed at cache B but has not been processed at cache C. As a result, cache C determines the data request from cache B cannot be processed at the time. The data request can be buffered for later processing.

Message Classification

A coherence protocol may employ broadcast messages, multicast messages, and point-to-point messages. It should be appreciated that maintaining triangle ordering is unnecessary for all coherence messages to reduce unnecessary overhead. To reduce unnecessary ordering constraints, we can distinguish messages with different ordering requirements and treat them accordingly.

In one dimension, coherence messages can be categorized into causing messages and non-causing messages. In the proposed sequencing mechanism, a causing message is a broadcast message. In other words, when a node issues a causing message, it needs to issue the message (or a notice with the same sequence number) to all nodes. A non-causing message is a message that can never behave as a causing message in any triangle ordering scenario. A non-causing message can be a point-to-point, multicast or broadcast message. No sequence number is assigned to a non-causing message.

In another dimension, coherence messages can be categorized into resulting and non-resulting messages. A resulting message cannot be processed until corresponding causing messages are processed. A non-resulting message is a message that can never behave as a resulting message in a triangle ordering scenario. A non-resulting message can be processed immediately when it is received. No LRTR information needs to be included in a non-resulting message.

A causing message can be a causing and resulting ("C-R") message, or a causing and non-resulting ("C-NR") message. Likewise, a non-causing message can be a non-causing and resulting ("NC-R") message, or a non-causing and non-resulting ("NC-NR") message. While C-R messages can be handled according to the triangle ordering mechanism, C-NR, NC-R and NC-NR messages need to be handled differently. The table below summarizes differences of the four message types.

| | What information is included when a message is issued? | | When a received message can be processed? Is LRTR update necessary when a message is processed? | |
|---|---|---|---|---|
| | Sequence num | LRTR info | Message processing | LRTR update |
| C-R | Yes | Yes | Based on LRTR comparison result | Yes |
| C-NR | Yes | No | Immediately | Yes |
| NC-R | No | Yes | Based on LRTR comparison result | No |
| NC-NR | No | No | Immediately | No |

A C-NR message has a sequence number, but includes no LRTR information of the sending node. When a C-NR message is received, it can be processed immediately. The corresponding LRT entry at the receiving node needs to be updated accordingly. A NC-R message has no sequence number, but includes LRTR information of the sending node. When a node receives a NC-R message, it determines if the message can be processed by comparing its LRTR with the LRTR included in the received message. No update is needed for the LRTR at the receiving node when the message is processed.

A NC-NR message can be handled without any ordering consideration. When it is issued, it has no sequence number, and includes no LRTR information of the sending node. When it is received, it can be processed immediately without any LRTR update at the receiving node.

In an SMP system, a triangle ordering violation typically happens in a scenario as follows: (1) cache A invalidates the data copy in cache B; (2) cache B then receives a data copy from another cache or memory; and (3) cache A assumes cache B includes no data copy, and executes a cache operation according to the incorrect information that may violate cache coherence. This indicates that a message that intends to invalidate a data copy or confirm no valid data copy exists in a cache usually needs to be treated as a causing message, and a message that intends to obtain a data copy usually needs to be treated as a resulting message.

In a typical MESI-like snoopy protocol, an invalidate request is usually treated as C-NR message, and a data request is usually treated as a C-R or NC-R message. A RWITM request is a combination of a data request and an invalidate request, and therefore is usually treated as a C-R message. As shown in FIG. 4, a data request needs to be treated as a causing message, if the requesting cache can access memory when requested data is not found in snooped caches. On the other hand, a data request can be treated as a non-causing message, provided that the requesting cache performs no cache operation that can violate cache coherence when requested data is not found in snooped caches. In FIG. 3, for example, cache B can send a point-to-point data request to cache C, instead of a broadcast request to caches A and C. This is possible when cache B includes a cache prediction mechanism that predicts where requested data of a cache miss can be found. In this case, the data request can be treated as a non-causing message. It should be appreciated that, if the prediction turns out to be incorrect, cache B cannot retrieve data from memory before broadcasting a data request to all caches. In general, reply messages including data replies and invalidate acknowledgments can be treated as NC-NR messages.

Optimizations of Triangle Ordering Mechanism

A drawback of the triangle ordering mechanism given above is potential performance degradation due to false waiting, because it enforces triangle ordering between causing and resulting messages regardless of whether same cache line is involved. A false waiting occurs when a cache determines that processing of a message needs to be delayed until processing of another message regarding a different cache line is completed. Referring now to FIG. 7, we show an example of false waiting due to unnecessary triangle ordering. Initially cache A includes a shared copy of address x, and cache C includes a shared copy of address y that can be sourced to another cache. Consider cache operations as follows.

(1) Cache A broadcasts an invalidate request on address x to caches B and C to claim the exclusive ownership of the cache line;

(2) Cache B receives the invalidate request from cache A and sends an invalidate acknowledgment to cache A;

(3) Cache B sends a data request on address y to cache C.

(4) Cache C receives the data request on address y from cache B before the invalidate request on address x from cache A. As a result, the triangle ordering mechanism prevents cache C from supplying data of address y to cache B, even though addresses x and y represent different cache lines.

It is obvious that false waiting can be eliminated when triangle ordering is enforced only between coherence messages regarding same address at cache line granularity. However, this is impractical since it requires that CT and LRTR information be maintained for each cache line in each cache. A reasonable implementation is to properly partition coherence messages into multiple non-overlapping sequencing classes, and enforce triangle ordering only between messages within the same sequencing class. Coherence messages can generally be partitioned via an appropriate hash function on addresses to ensure that messages in the same sequencing class are unlikely to occur simultaneously. For example, coherence messages regarding addresses that are mapped to the same cache set in a set-associative cache can form a sequencing class. Each sequencing class maintains its own CT and LRTR to enforce triangle ordering for messages within the sequencing class.

Consider an SMP system that comprises 8 processors, wherein each processor contains a 16-way 2 MB cache with 128B cache line size. Suppose each cache set corresponds to a sequencing class, wherein each sequencing class employs a 4-bit sequencing mechanism, allowing up to 16 outstanding C-R or C-NR broadcast messages for cache set at every node. As a result, each cache set maintains a 4-bit CT and a 28-bit LRTR, implying 4B storage overhead for 16 128B cache lines. Furthermore, a C-NR broadcast message such as an invalidate request needs to include a 4-bit sequence number. A C-R broadcast message such as a data request or RWITM request needs to include a 4-bit sequence number and a 28-bit LRTR, resulting in 4B extra bandwidth consumption.

The triangle ordering mechanism can be further optimized in various ways. For example, when a node issues a causing message, it is unnecessary to include LRT information for a peer node if the information has been included in a previous message. At each node, each LRT entry has an associated update bit that initially is set to clean (0). When a node processes a causing message, the update bit of the corresponding LRT entry is set to dirty (1) while the LRT entry is updated accordingly. When a node issues a resulting message, it includes information of an LRT entry in the message only if the update bit of the LRT entry is dirty. When information of an LRT entry is included in a resulting broadcast message, the update bit of the LRT entry is set to clean. A node can chose to broadcast its LRTR information in a separate message.

In SMP systems in which caches are interconnected with each other via a bi-directional ring with the triangle ordering support, a cache can broadcast a data request of a cache miss using both directions to reduce cache miss latency. For example, consider a system that comprises 16 caches labeled from $C_0$ to $C_{15}$ along the ring. When cache $C_0$ has a cache miss, cache $C_0$ broadcasts a data request in two directions: one to caches $C_1$, $C_2$ to $C_8$, and the other to caches $C_{15}$, $C_{14}$ to $C_9$.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system for ensuring triangle ordering of messages in a computer system, comprising:

a plurality of caches comprising a first cache, a second cache and a third cache;

a message-passing interconnect connecting the plurality of caches;

a triangle ordering mechanism maintained for the first cache, the second cache and the third cache, wherein the first cache sends a first message to the second cache and the third cache, and the second cache sends a second message to the third cache, and wherein the triangle ordering mechanism ensures that the third cache receives and processes the first message before receiving and processing the second message, if the second cache receives and processes the first message before sending the second message; and a plurality of sequencing classes, the plurality of sequencing classes comprising a first sequencing class, the first sequencing class comprising the first message and the second message, wherein the triangle ordering mechanism comprises a first CT (current timestamp) maintained in the first cache, the first CT indicating a sequence number for the first message if the first message is the next message of the first sequencing class to be sent from the first cache, wherein the triangle ordering mechanism comprises a first LRTR (last received timestamp record) maintained in the second cache, the first LRTR comprising a first LRT (last received timestamp) for the first cache, the first LRT indicating the sequence number of the last received and processed message of the first sequencing class from the first cache, and wherein the triangle ordering mechanism comprises a second LRTR maintained in the third cache, the second LRTR comprising a second LRT for the first cache, the second LRT indicating the sequence number of the last received and processed message of the first sequencing class from the first cache.

2. The system of claim 1, wherein when the first cache sends the first message, (a) the first CT is included with the first message, and (b) the first CT is updated to indicate a sequence number of a third message if the third message is the next message of the first sequencing class to be sent from the first cache;

wherein when the second cache receives and processes the first message, the second cache updates the first LRT according to the first CT included in the first message;

wherein when the second cache sends the second message after receiving and processing the first message, the updated first LRT is included in the second message.

3. The system of claim 2, wherein when the third cache receives the second message, the triangle ordering mechanism determines that the second message cannot be processed immediately if the first message has been received and processed in the second cache according to the updated first LRT included in the second message, and if the first message has not been received and processed in the third cache according to the second LRT maintained in the third cache.

4. The system of claim 3, wherein if the triangle ordering mechanism determines that the second message cannot be processed immediately, the second message is buffered in the third cache, and wherein the third cache processes the buffered second message after the third cache receives and processes the first message.

5. The system of claim 3, wherein if the triangle ordering mechanism determines that the second message cannot be processed immediately, the third cache sends a retry notice to the second cache for the second cache to re-send the second message to the third cache.

6. The system of claim 3, wherein the triangle ordering mechanism comprises a sequence number management mechanism, the sequence number management mechanism ensuring that the sequence number indicated by the first CT cannot be used for the third message of the first sequencing class from the first cache, if the sequence number is included in the first message of the first sequencing class from the first cache, and the first message has not been received and processed in the second cache and the third cache.

7. The system of claim 3, wherein the first sequencing class comprises cache coherence messages regarding a memory address in a set of memory addresses defined by a hash function.

8. The system of claim 3, wherein the first sequencing class comprises cache coherence messages regarding a cache line set in the first cache.

9. The system of claim 3, comprising a set of C-R (causing and resulting) messages, a set of C-NR (causing and non-resulting) messages, a set of NC-R (non-causing and resulting) messages, and a set of NC-NR (non-causing and non-resulting) messages; wherein each of the set of C-R messages includes a sequence number and an LRT (last received timestamp); wherein each of the set of C-NR messages includes a sequence number and excludes an LRT; wherein each of the set of NC-R messages includes an LRT and excludes a sequence number; and wherein each of the set of NC-NR messages excludes a sequence number and an LRT.

10. The system of claim 9, wherein each of the set of C-NR messages is processed immediately when the each of the set of C-NR messages is received;

wherein each of the set of NC-NR messages is processed immediately when the each of the set of NC-NR messages is received; wherein processing of a received message cannot be delayed to wait for any of the set of NC-R messages; and wherein processing of a received message cannot be delayed to wait for any of the set of NC-NR messages.

11. The system of claim 9, wherein the first message belongs to one of the set of C-R messages and the set of C-NR messages; and wherein the second message belongs to one of the set of C-R messages and the set of NC-R messages.

12. The system of claim 1, wherein when a cache miss occurs in the first cache, the first caches sends a cache request to the plurality of caches via the message-passing interconnect.

13. The system of claim 1, wherein the message-passing interconnect is one of a ring-based network, a mesh-based network, a torus-based network, a hypercube-based network, and a general message-passing network.

14. A system for ensuring triangle ordering of messages in a computer system, comprising:

a plurality of nodes comprising a first node, a second node and a third node;

a message-passing interconnect connecting the plurality of nodes;

a triangle ordering mechanism maintained for the first node, the second node and the third node;

wherein the first node sends a first message to the second node and the third node, and the second node sends a second message to the third node;

wherein the triangle ordering mechanism ensures that the third node receives and processes the first message before receiving and processing the second message, if the second node receives and processes the first message before sending the second messages wherein the triangle ordering mechanism comprises a first CT (current timestamp) maintained in the first node, the first CT indicating a sequence number for next message to be sent from the first node;

wherein the triangle ordering mechanism comprises a first LRTR (last received timestamp record) maintained in the second node, the first LRTR comprising a first LRT (last received timestamp) for the first node, the first LRT indicating the sequence number of the last received and processed message from the first node; and wherein the triangle ordering mechanism comprises a second LRTR maintained in the third node, the LRTR comprising a second LRT for the first node, the second LRT indicating the sequence number of the last received and processed message from the first node;

wherein when the first node sends the first message, the first CT is included with the first message, the first CT then being updated to indicate another sequence number;

wherein when the second node receives and processes the first message, the second node updates the first LRT according to the first CT included in the first message; and wherein when the second node sends the second message after receiving and processing the first message, the updated first LRT is included in the second message.

15. The system of claim 14, wherein when the third node receives the second message, the triangle ordering mechanism determines that the second message cannot be processed immediately if the first message has been received and processed in the second node according to the updated first LRT included in the second message, and if the first message has not been received and processed in the third node according to the second LRT maintained in the third node.

16. The system of claim 15, wherein if the triangle ordering mechanism determines that the second message cannot be processed immediately, the second message is buffered in the third node, and wherein the third node processes the buffered second message after the third node receives and processes the first message.

17. The system of claim 15, wherein if the triangle ordering mechanism determines that the second message cannot be processed immediately, the third node sends a retry notice to the second node for the second node to re-send the second message to the third node.

18. The system of claim 14, wherein each of the plurality of nodes comprises at least one of a thread, a process, a computation task, a processor, a cache and a memory.

19. A system for ensuring triangle ordering of messages in a computer system, comprising:
a plurality of nodes comprising a first node, a second node and a third node;
a message-passing interconnect connecting the plurality of nodes;
a triangle ordering mechanism maintained for the first node, the second node and the third node;
wherein the first node sends a first message to the second node and the third node, and the second node sends a second message to the third node;
wherein the triangle ordering mechanism ensures that the third node receives and processes the first message before receiving and processing the second message, if the second node receives and processes the first message before sending the second message;
wherein the triangle ordering mechanism comprises a first CT (current timestamp) maintained in the first node, the first CT indicating a sequence number for next message from the first node;
wherein the triangle ordering mechanism comprises a second CT maintained in the second node, the second CT indicating a sequence number for next message from the second node;
wherein the triangle ordering mechanism comprises a third CT maintained in the third node, the third CT indicating a sequence number for next message from the third node;
wherein the triangle ordering mechanism comprises a first LRTR (last received timestamp record) maintained in the first node, the first LRTR indicating (a) the sequence number of the last received and processed message from the second node, and (b) the sequence number of the last received and processed message from the third node;
wherein the triangle ordering mechanism comprises a second LRTR maintained in the second node, the second LRTR indicating (a) the sequence number of the last received and processed message from the first node, and (b) the sequence number of the last received and processed message from the third node; and wherein the triangle ordering mechanism comprises a third LRTR maintained in the third node, the third LRTR indicating (a) the sequence number of the last received and processed message from the first node, and (b) the sequence number of the last received and processed message from the second node.

20. The system of claim 19, wherein when the first node sends the first message, the first CT is included with the first message, the first CT then being updated to indicate another sequence number;
wherein when the second node receives and processes the first message, the second node updates the second LRTR according to the first CT included in the first message; and
wherein when the second node sends the second message after receiving and processing the first message, the updated second LRTR is included in the second message.

21. The system of claim 20, wherein when the third node receives the second message, the triangle ordering mechanism determines that the second message cannot be processed immediately if the first message has been received and processed in the second node according to the updated second LRT included in the second message, and if the first message has not been received and processed in the third node according to the third LRT maintained in the third node.

22. A system for ensuring triangle ordering of messages in a computer system, comprising:
a plurality of caches comprising a first cache, a second cache and a third cache;
a message-passing interconnect connecting the plurality of caches;
a triangle ordering mechanism maintained for the first cache, the second cache and the third cache;
wherein the first cache sends a first message to the second cache and the third cache, and the second cache sends a second message to the third cache;
wherein the triangle ordering mechanism ensures that the third cache processes the first message before processing the second message, if the second cache receives and processes the first message before sending the second message;
wherein the triangle ordering mechanism comprises a first CT (current timestamp) maintained in the first cache, the first CT indicating a sequence number for the first message if the first message is the next message to be sent from the first cache;
wherein the triangle ordering mechanism comprises a first LRTR (last received timestamp record) maintained in the second cache, the first LRTR comprising a first LRT (last received timestamp) for the first cache, the first LRT indicating the sequence number of the last received and processed message from the first cache; and
wherein the triangle ordering mechanism comprises a second LRTR maintained in the third cache, the second LRTR comprising a second LRT for the first cache, the second LRT indicating the sequence number of the last received and processed message from the first cache.

23. The system of claim 22, wherein when the first cache sends the first message, (a) the first CT is included with the first message, and (b) the first CT is updated to indicate a sequence number of a third message if the third message is the next message to be sent from the first cache;

wherein when the second cache receives and processes the first message, the second cache updates the first LRT according to the first CT included in the first message; and wherein when the second cache sends the second message after receiving and processing the first message, the updated first LRT is included in the second message.

24. The system of claim 23, wherein when the third cache receives the second message, the triangle ordering mechanism determines that the second message cannot be processed immediately if the first message has been received and processed in the second cache according to the updated first LRT included in the second message, and if the first message has not been received and processed in the third cache according to the second LRT maintained in the third cache.

25. The system of claim 24, wherein if the triangle ordering mechanism determines that the second message cannot be processed immediately, the second message is buffered in the third cache, and wherein the third cache processes the buffered second message after the third cache receives and processes the first message.

26. The system of claim 24, wherein if the triangle ordering mechanism determines that the second message cannot be processed immediately, the third cache sends a retry notice to the second cache for the second cache to re-send the second message to the third cache.

27. The system of claim 24, wherein the triangle ordering mechanism comprises a sequence number management mechanism, the sequence number management mechanism ensuring that the sequence number indicated by the first CT cannot be used and included in the third message from the first cache, if the sequence number is included in the first message from the first cache, and if the first message has not been received and processed in the second cache and the third cache.

* * * * *